(12) United States Patent
Lee

(10) Patent No.: US 9,643,520 B2
(45) Date of Patent: May 9, 2017

(54) COMBINED CAR SEAT COVER AND INFANT SEAT

(71) Applicant: Nam-Jin Lee, Namyangju-si (KR)

(72) Inventor: Nam-Jin Lee, Namyangju-si (KR)

( * ) Notice: Subject to any disclaimer, the term of this patent is extended or adjusted under 35 U.S.C. 154(b) by 12 days.

(21) Appl. No.: 14/400,175

(22) PCT Filed: Nov. 5, 2012

(86) PCT No.: PCT/KR2012/009228
§ 371 (c)(1),
(2) Date: Nov. 10, 2014

(87) PCT Pub. No.: WO2013/168864
PCT Pub. Date: Nov. 14, 2013

(65) Prior Publication Data
US 2015/0145297 A1    May 28, 2015

(30) Foreign Application Priority Data
May 10, 2012 (KR) .................. 10-2012-0049614

(51) Int. Cl.
*B60R 22/00* (2006.01)
*B60N 2/28* (2006.01)
(Continued)

(52) U.S. Cl.
CPC ............. *B60N 2/2839* (2013.01); *B60N 2/26* (2013.01); *B60N 2/2809* (2013.01);
(Continued)

(58) Field of Classification Search
CPC ....... B60N 2/2839; B60N 2/26; B60N 2/2809
(Continued)

(56) References Cited

U.S. PATENT DOCUMENTS 4,986,600 A * 1/1991 Leblanc ............... B60N 2/3084
297/112
5,299,855 A * 4/1994 Zubeck ................ B60N 2/2812
297/467
(Continued)

FOREIGN PATENT DOCUMENTS

KR    20-0274037 Y1    5/2002
KR    20-0397082 Y1    9/2005
(Continued)

*Primary Examiner* — Laurie K Cranmer
(74) *Attorney, Agent, or Firm* — Jefferson IP Law, LLP

(57) ABSTRACT

The present invention relates to a combined car seat cover and infant seat, which is normally used as a seat cover for improving a riding comfort and can be transformed into an infant seat when an infant or a child is a passenger, wherein a seat fixing means for fixing a seat cover to a car seat is formed at the back of the seat cover including a seat sheet and a backrest sheet in which a cushioning material is accommodated therein, a safety belt is provided on both sides of the seat cover, a foldable shielding member is formed on the seat sheet, and the seat cover can be used as an infant seat by using the shielding member and the safety belt, and even in the case of an impact, a seat cover having this structure effectively prevents damage to the seat cover and disperses the impact by means of the safety belt and a reinforcing band, thereby preventing injuries.

8 Claims, 13 Drawing Sheets

(51) Int. Cl.
*B60N 2/60* (2006.01)
*B60N 2/26* (2006.01)

(52) U.S. Cl.
CPC ......... *B60N 2/2812* (2013.01); *B60N 2/2881* (2013.01); *B60N 2/2887* (2013.01); *B60N 2/60* (2013.01)

(58) Field of Classification Search
USPC ....... 297/485, 250.1, 254, 256.15, 467, 487, 297/488, 219.12, 228.12
See application file for complete search history.

(56) References Cited

U.S. PATENT DOCUMENTS

| | | | | |
|---|---|---|---|---|
| 5,354,121 A * | 10/1994 | Allum | ................... | A47D 15/006 297/485 |
| 5,468,020 A * | 11/1995 | Scime | ................... | B60N 2/2803 280/801.1 |
| 5,472,260 A * | 12/1995 | Czapski | ............... | B60N 2/3084 297/112 |
| 5,496,092 A * | 3/1996 | Williams | .............. | A61F 5/3792 297/250.1 |
| 5,503,461 A * | 4/1996 | Schreier | ............... | B60N 2/3084 297/467 |
| 5,826,287 A * | 10/1998 | Tandrup | .................. | A47D 13/08 297/219.12 |
| 6,364,417 B1 * | 4/2002 | Silverman | ............. | B60R 22/105 297/464 |
| 6,709,055 B2 * | 3/2004 | Gengler | ............... | A47C 31/113 297/228.12 |
| 6,863,350 B1 * | 3/2005 | McCulley | ............ | B60N 2/2806 224/576 |
| 7,021,719 B2 * | 4/2006 | Stoll | ..................... | B60N 2/265 297/250.1 |
| 7,156,458 B2 * | 1/2007 | Hanberg | .............. | A47D 15/006 297/219.1 |
| 7,188,899 B1 * | 3/2007 | McClellan-Derrickson | .......... | B60N 2/2806 297/188.06 |
| 7,347,494 B2 * | 3/2008 | Boyle | .................. | B60N 2/2806 297/253 |
| 7,552,969 B2 * | 6/2009 | Maciejczyk | ......... | B60N 2/2809 280/801.1 |
| 7,798,527 B2 * | 9/2010 | Walton | ................... | B60N 2/242 280/801.1 |
| 7,891,741 B2 * | 2/2011 | Lienr, Jr. | ............. | B60N 2/2812 297/464 |
| 8,210,617 B2 * | 7/2012 | Aaron | ................... | B60N 2/2833 297/253 |
| 8,251,457 B2 * | 8/2012 | Britton | ................. | B60N 2/2806 297/219.1 |
| 8,794,709 B2 * | 8/2014 | Kennedy | ................ | B60R 22/10 297/465 |
| 2003/0173817 A1* | 9/2003 | Vits | ........................ | B60N 2/265 297/484 |
| 2008/0122274 A1* | 5/2008 | Edwards | ................ | A47C 31/11 297/228.12 |
| 2010/0314915 A1* | 12/2010 | Mills | .................... | A47D 15/006 297/188.01 |
| 2015/0182036 A1* | 7/2015 | Wigzell | ................ | B60N 2/2812 297/256.15 |

FOREIGN PATENT DOCUMENTS

KR 10-2009-0129679 A 12/2009
KR 10-1028226 B1 4/2011

* cited by examiner

COMBINED CAR SEAT COVER AND INFANT SEAT

TECHNICAL FIELD

The present invention relates to a combined car seat cover and infant seat usable by both adults and infants without separately installing a car seat for an infant even when the adult and the infant alternately board a vehicle.

BACKGROUND ART

In general, a car seat includes a seat base and a backrest made up of a cushion material, and a seat cover, which is used to cover a seat, is used for various needs such as preventing the seat from being damaged by preventing the seat from being directly exposed, allowing easy ventilation to prevent a back of a passenger from wetting by sweat in a summer time, or further enhancing riding comfort by accommodating a cushion material inside the seat cover or by fitting the seat to a body shape of a passenger.

Specifically, the seat cover, in which a seat sheet and a backrest sheet are provided corresponding to a seat base and a backrest of the seat, respectively, is used by placing the seat cover on the seat, but the problem is that a separate car seat for an infant needs to be installed after removing the seat cover when the infant boards the vehicle.

Therefore, since the seat cover or the car seat for an infant needs to be removed whenever the adult or the infant boards if the adult and the infant alternately boards the vehicle, it is very cumbersome, so most of the homes with infants or children drive the vehicle without removing the car seat for infants if the car seat for infants is installed once and remove the car seat only when necessary to allow the adult to board the vehicle. But this method limits the number of persons to board the vehicle since the seat installed with the car seat for infants cannot be used when the infant or the child does not board the vehicle, and also becomes more difficult to use when there are more than one child.

In addition, the car seat has a large volume and takes up a lot of space in a trunk when it is stored in the trunk, so that necessary things may not be sufficiently accommodated in the trunk because only a narrow space remains in the trunk.

In addition, a validity of the car seat is very short in contrast to the high price of the car seat, and especially, the car seat cannot be used in other usages after the infant or the child grows up, so most of the car seats are sold or discarded due to storage reasons.

Further, using the seat belts is recommended to prevent or attenuate safety accidents, but when using mass transportation such as a taxi, the infant or the child seats in a normal seat and fastens a seat belt since the car seat for children is not provided, but there are serious safety problems since the safety device are actually useless because it does not fit the body shape of the infant or the child.

DISCLOSURE

Technical Problem

Therefore, the present invention protects a seat while improving riding comfort by using a seat cover on a seat of a vehicle, and, solves the inconvenience of separately installing a car seat for infants whenever an infant or a child boards the vehicle by making the seat cover to be used as the car seat for infants, and implements a safety device to fit a body of the infant or the child even when boarding a mass transportation such as a taxi.

In addition, when using the seat cover as the car seat for infants, a coupling structure of a safety belt disperses an impact generated when an accident occurs to the entire seat cover so that the seat cover is prevented from being torn as well as absorbing the impact upon the accident.

Technical Solution

Therefore, in the present invention, in which a seat cover includes a seat sheet and a backrest sheet to be used on a top of a seat of a vehicle, cushion materials are accommodated in the seat sheet and the backrest sheet to provide a cushion function, a lower latch and a back latch are provided on a lower part and a back part of the seat cover and fixedly installed to a seat hook and a backrest hook provided on the seat sheet of the vehicle so that the seat cover does not move, a shielding member is provided on the seat sheet of the seat cover and a safety belt is provided on a backrest cover, wherein a safety belt is fixed to the shielding member by a buckle so that the seat cover is used as an infant seat.

In addition, center parts of each of the seat sheet and the backrest sheet includes seat cushions and side cushions, which have improved impact absorbing functions and protrude relatively higher than the seat cushion to improve impact absorbing function, are provided at both sides of the seat cushion so that a riding comfort of a passenger is improved while absorbing the impact by supporting both sides of a head of an infant or a child.

Further, the shielding member accommodates a cushion material therein and a seat cushion of the seat sheet provides a concave part formed in a shape of the shielding member to accommodate the shielding member in the concave part so that an upward protrusion of the car seat is minimized when the car seat is not used.

In addition, an horizontal band and a vertical band is sewed to a back of the backrest sheet while a lower latch is coupled to the horizontal band and a back latch is coupled to the vertical band to reinforce the backrest sheet, and the safety belt is coupled to both ends of the horizontal band in such a manner that the safety belt passes through the shielding member and couples to the vertical band again so that when the infant and the child fastens the safety belt, the entire portion of the body is embraced and protected by the safety belt and the band and the impact generated during accidents is dispersed to the entire part of seat cover.

Advantageous Effects

Therefore, the present invention enables a seat cover to be installed on a seat of the vehicle to be used as a car seat for infants when necessary, so that the riding comfort can be improved, inconvenience of separately assembling or disassembling the car seat for infants can be solved, production and usage can be convenient since the structure of the car seat and installation are simple, and storage is easy when disassembling and storing the car seat since the volume of the car seat is small. Further, the seat of the vehicle can be utilized more widely and infants and children can be safely protected since the car seat can always be installed in a mass transportation such as a taxi.

BEST MODE

Mode for Invention

Figure 1:
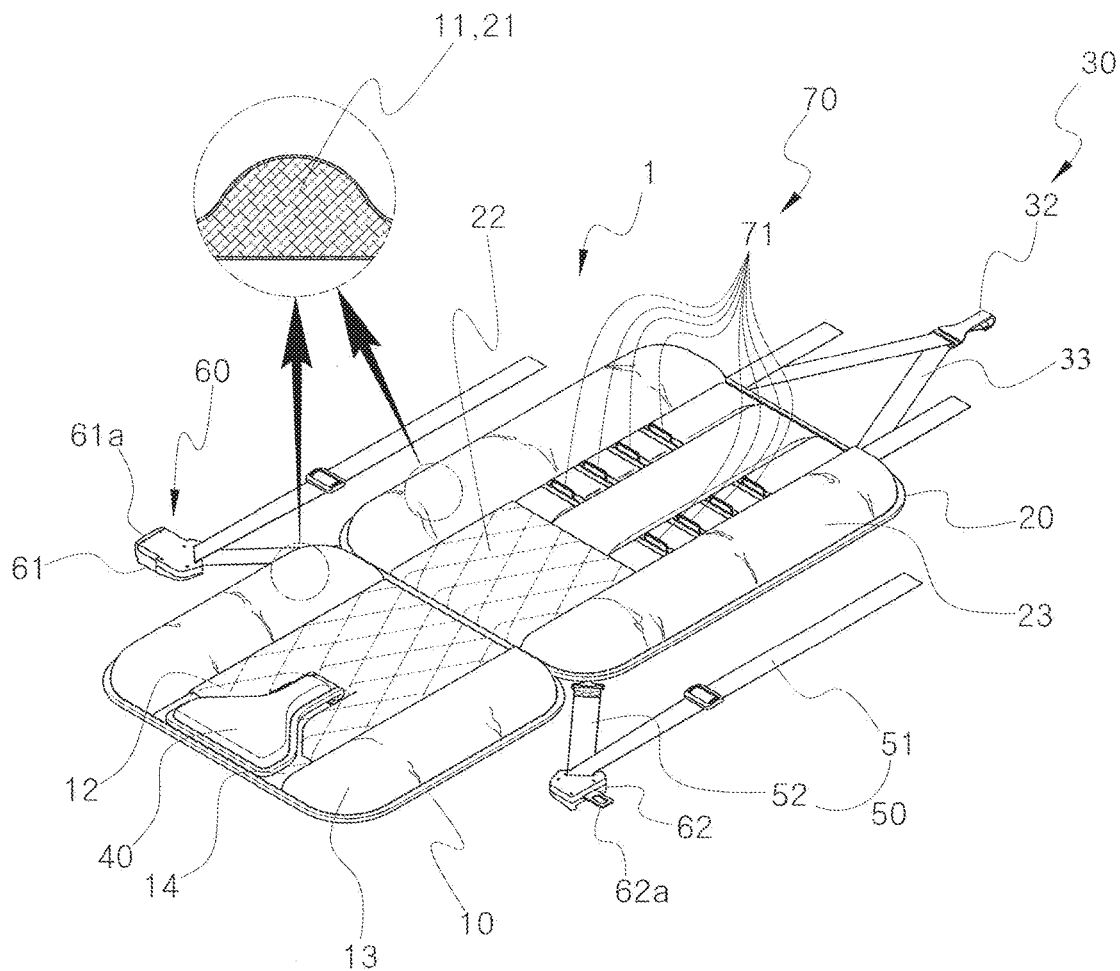
FIG. 1 is a perspective view illustrating a seat cover according to an embodiment of the present invention.
Figure 2:
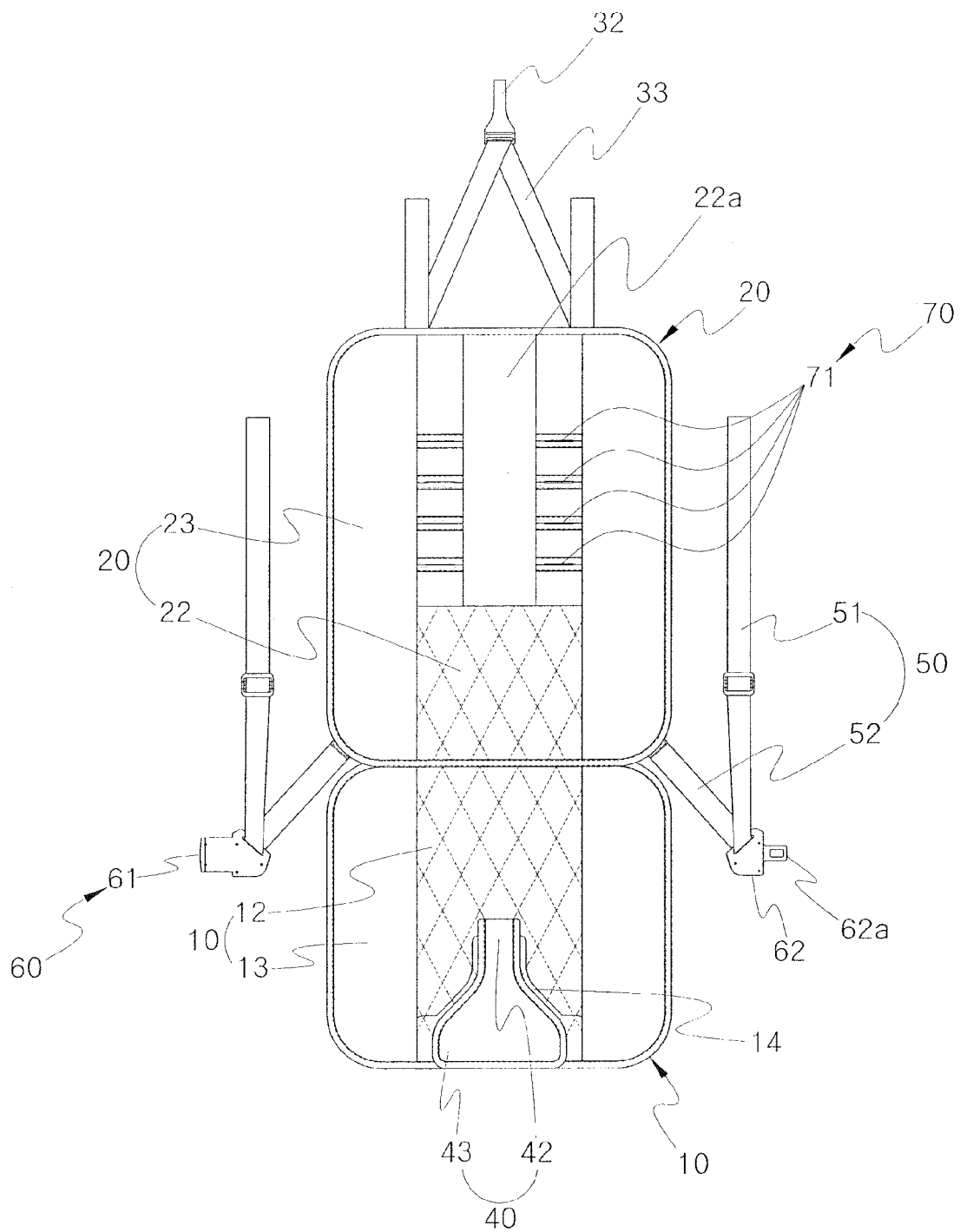
FIG. 2 is a plan view illustrating a structure of a seat cover of the present invention.

The present invention provides a seat cover 1 including a seat sheet 10 and a backrest sheet 20 and installed on a vehicle seat, and as illustrated in FIG. 1 to FIG. 4, a structure of the seat cover 1 includes a seat sheet 10 and a backrest sheet 20, in which cushion materials 11 and 12 are accommodated, wherein the seat sheet 10 and the backrest sheet 20 are installed on a vehicle seat by a seat fixing unit 30. In addition, a foldable shielding member 40 is provided on the seat sheet 10 so that when an infant or a child boards on a vehicle, the shielding member 40 and a safety belt 50 are coupled to each other to embrace a body of the infant or the child to prevent injuries, and the seat cover is used as a normal seat by folding the shielding member 40 when an adult boards the vehicle, therefore the seat cover can be used to improve a riding comfort for the adult or used as an infant seat for the safety of the infant with only one seat cover 1 without separately installing the car seat for infants in the seat of the vehicle.

Preferably, the seat fixing unit 30 includes a lower latch 31 provided on a lower end of the backrest sheet 20 and a back latch 32 provided on an upper part of the backrest seat 20 and the lower latch 31 and the back latch are fixed to the seat hook 100 and a backrest hook 200 provided on a seat of a vehicle, respectively, to fix the seat cover 1 to the seat of the vehicle seat, and the back latch 32 is coupled to the backrest hook 200 by an adjusting string 33 to adjust a length of the back latch 32 according to a height of the seat with respect to a type of the vehicle so that the back latch 32 is fixed to the backrest hook 200.

In addition, the shielding member 40 includes a foldable supporting part 42 and an expansion part 43 for legs of a passenger to be inserted into both sides of the shielding member to protect an abdomen region, and when the foldable supporting part 42 is fixed to a center part of the seat sheet 10 and foldable to a forward direction, the shielding member 40 is folded to the forward direction when the adult boards the vehicle, and the shielding member 40 is lifted up to fasten the safety belt 50 when the infant of the child boards the vehicle.

Further, preferably, a latch 41 is provided on the shielding member 40 to latch and fix the safety belt 50 to the shielding member 40, and the safety belt 50 is fixed to a band hanger 70 at a lower end of both sides of the backrest sheet 20.

Therefore, the body of the infant and the child can be safely protected due to having the shoulder contact part 51 and the leg support part 52 when the safety belt 50 is fastened, and the safety belt 50 is fixed to the shielding member 40 by using a buckle 50 so that both a left and right side of the safety belt 50 are coupled to each other while fixed in a radial shape from the center of the abdomen area of the infant and the child.

Preferably, the buckle 60 includes a buckle main body 61 having a female coupling part 61a and a buckle auxiliary body 62 having a male coupling part 62a in such a manner that the safety belt 50 may be coupled by inserting the buckle from both the left and right side of the safety belt, and coupled to each other by latching to the latch 41 of the shielding member 40 when the buckle 60 fastens the safety belt.

That is, by selecting any one of the buckle main body 61 and the buckle auxiliary body 62 and forming an outer shape of the selected body into a inserting part to be inserted to the latch 41, the buckle 60 is latched to the latch 41 when the buckle is fastened so that the buckle is prevented from becoming arbitrarily unfastened and also the safety belt 50 does not move left or right and maintains fastened.

In addition, when a concave part 14 in an identical shape as the shape of the shielding member 40 is formed on a disposition corresponding to a folding area of the shielding member 40 when the shielding member 40 is folded to the seat sheet 10, a portion of the shielding member 40 exposed to a top side can be minimized when the adult uses the seat cover as the seat cover by folding the shielding member 40 so that interference is prevented when the adult boards the vehicle, and also, by accommodating a cushion material in the shielding member, the abdomen area is protected when the seat cover is used as the infant seat, and also the riding comfort of the seat sheet 10 can be improved when used as a normal seat cover.

In addition, when attaching and detaching parts 44 are formed to correspond with each other on the shielding member 40 and the concave part 14, the shielding member 40 may be prevented from moving arbitrarily while in a folded state when the shielding member 40 is folded to be used as the seat cover for adults, wherein the attaching and detaching parts 44 may be formed by a snap-on button or a zipper, but most preferably, as illustrated in the figure of the present invention, it is preferable to attach Velcro fasteners corresponding to each other on the shielding member 40 and the concave part 14 so that the shielding member is easily attached and detached.

Meanwhile, side cushions 13 and 23, which protrude relatively more than the seat cushions 12 and 22, are provided at both sides of the seat cushion 12 and 22 provided on a center of the seat sheet 10 and the backrest sheet 20 so that the riding comfort of a passenger is improved while preventing the infant or the child from moving left and right by supporting both sides of the body of the infant or the child when boarding the vehicle.

In addition, the fabric of the seat sheet 10 and the backrest sheet 20 are made up of cloth or leather, and when a reinforcing band 80 is sewed to prevent the fabric from being torn or damaged when the impact is applied to the sheet, the impact transferred to the seat cover 1 when the impact is applied to the sheet is dispersed to the reinforcing band 81 to prevent the fabric from being torn or damaged while safely protecting the infant and the child by preventing the infant and the child from ballasting out when used as the infant seat.

Figure 3:
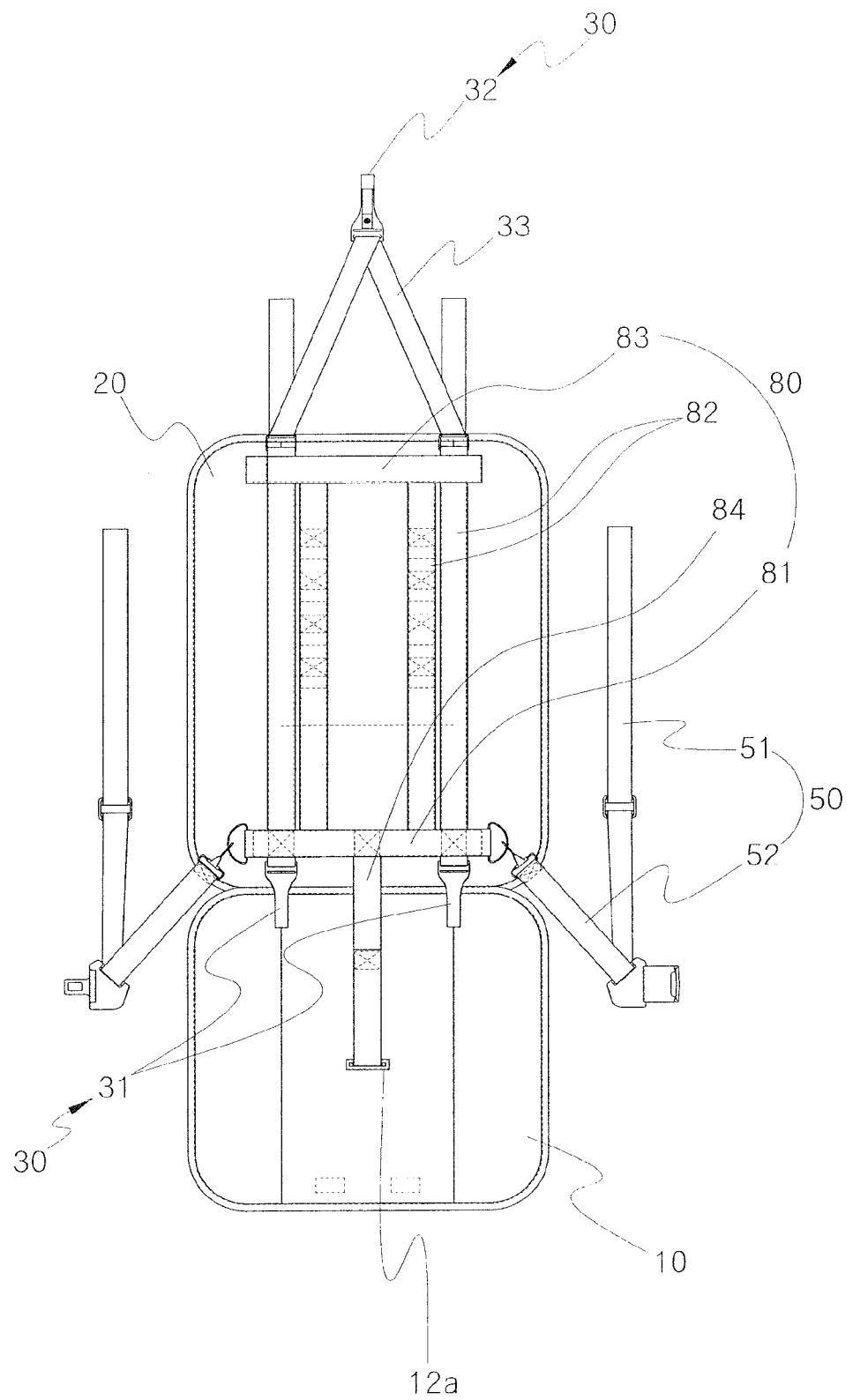
FIG. 3 is a bottom view illustrating a structure of a seat cover of the present invention.
Figure 4:
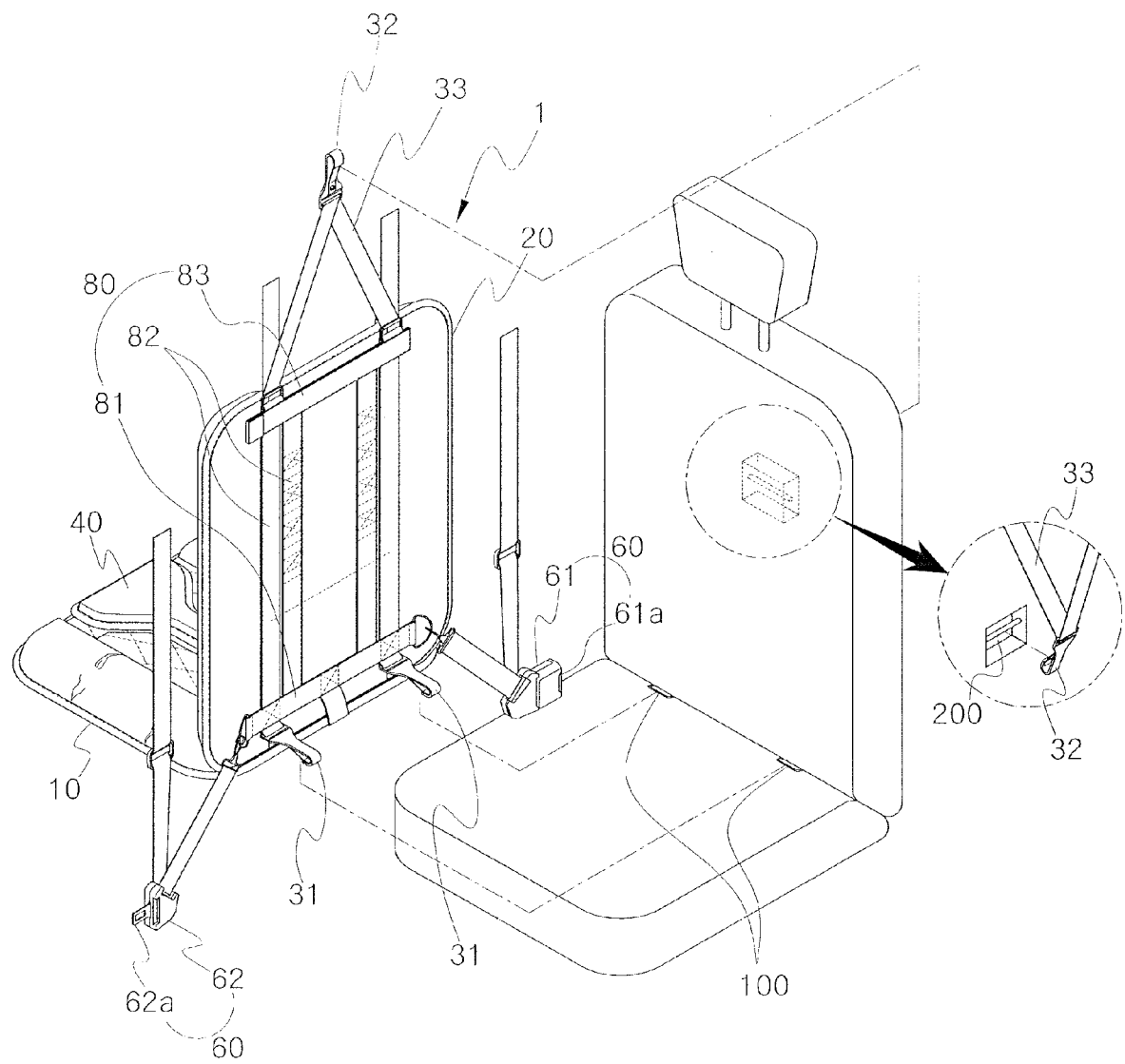
FIG. 4 is a perspective view illustrating a seat installation structure of a seat cover of the present invention.
Figure 5:
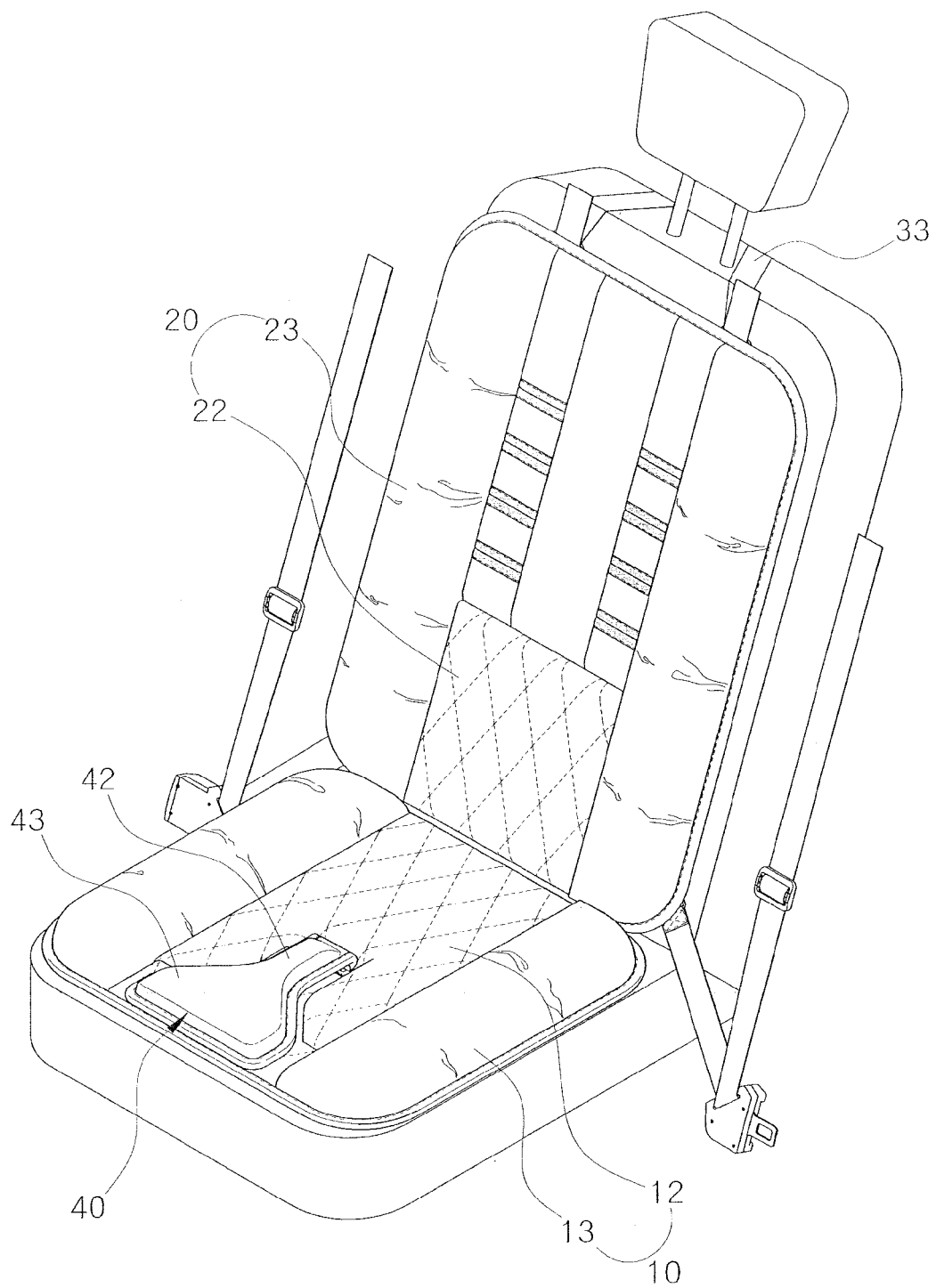
FIG. 5 is a perspective view illustrating a seat cover installed to a seat of the present invention.

The structure of the reinforcing band 80 is formed by a horizontal band 81 and a vertical band 82 intersecting with each other on the backrest seat 20 to disperse the impact to the entire seat when the impact is applied. In the structure of the horizontal band 81 and the vertical band 82, as illustrated in FIG. 3 and FIG. 4, the horizontal band 81 is sewed on a lower end of the backrest sheet 20 while two vertical bands 82 are sewed on both sides of the backrest seat so that the horizontal band 81 and the vertical band 82 intersect with each other while preventing the sheet from being torn. And more preferably, when the reinforcing band 80 is coupled to the safety belt 50, the entire body of the infant and the child is embraced by the safety belt 50 and the reinforcing band 80 when used as the infant seat so that the impact transferred to the body is dispersed to minimize the impact from accidents.

Figure 6:
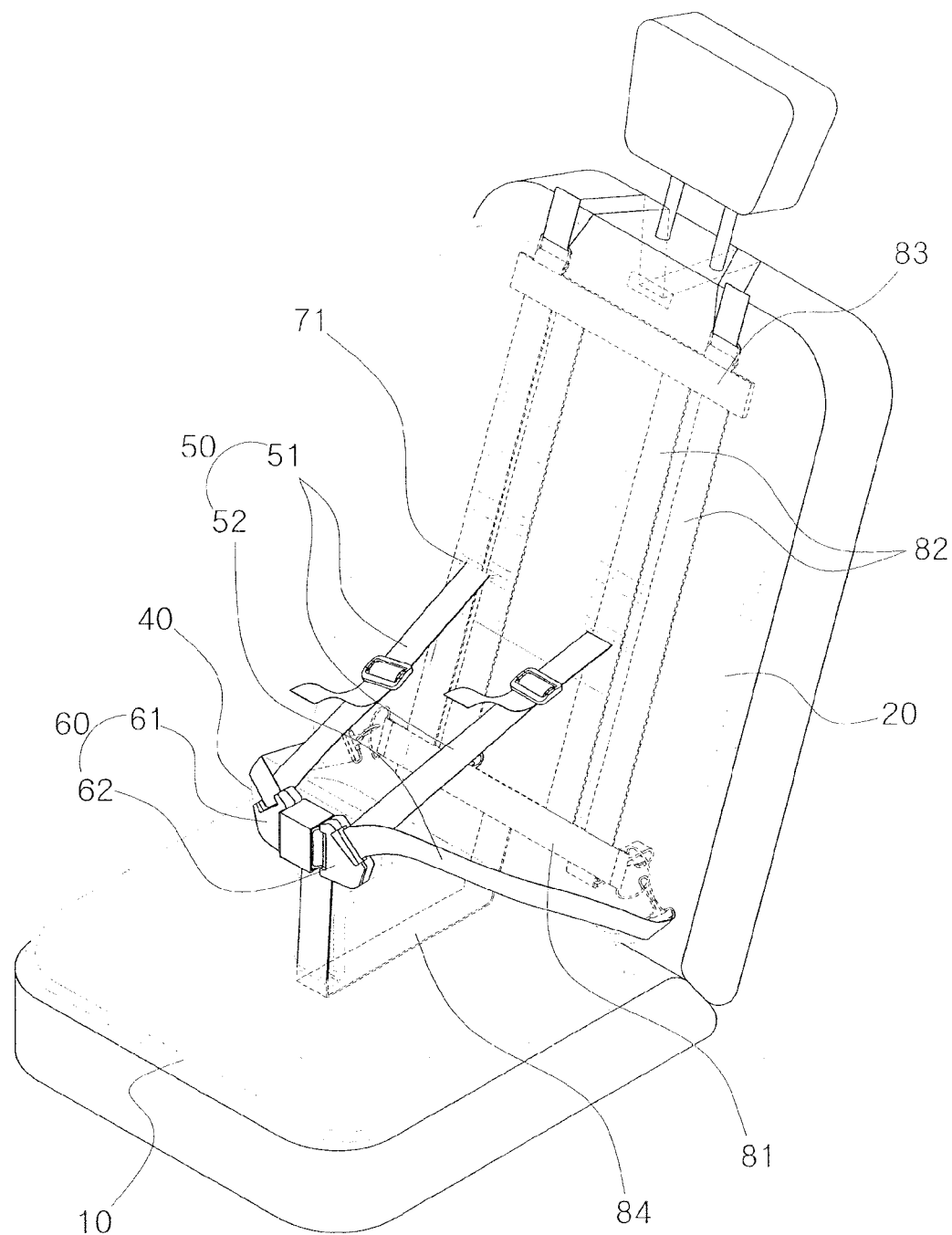
FIG. 6 is a schematic view illustrating a coupling structure of a safety belt and a reinforcing band when fastening the safety belt of the present invention.
Figure 7:
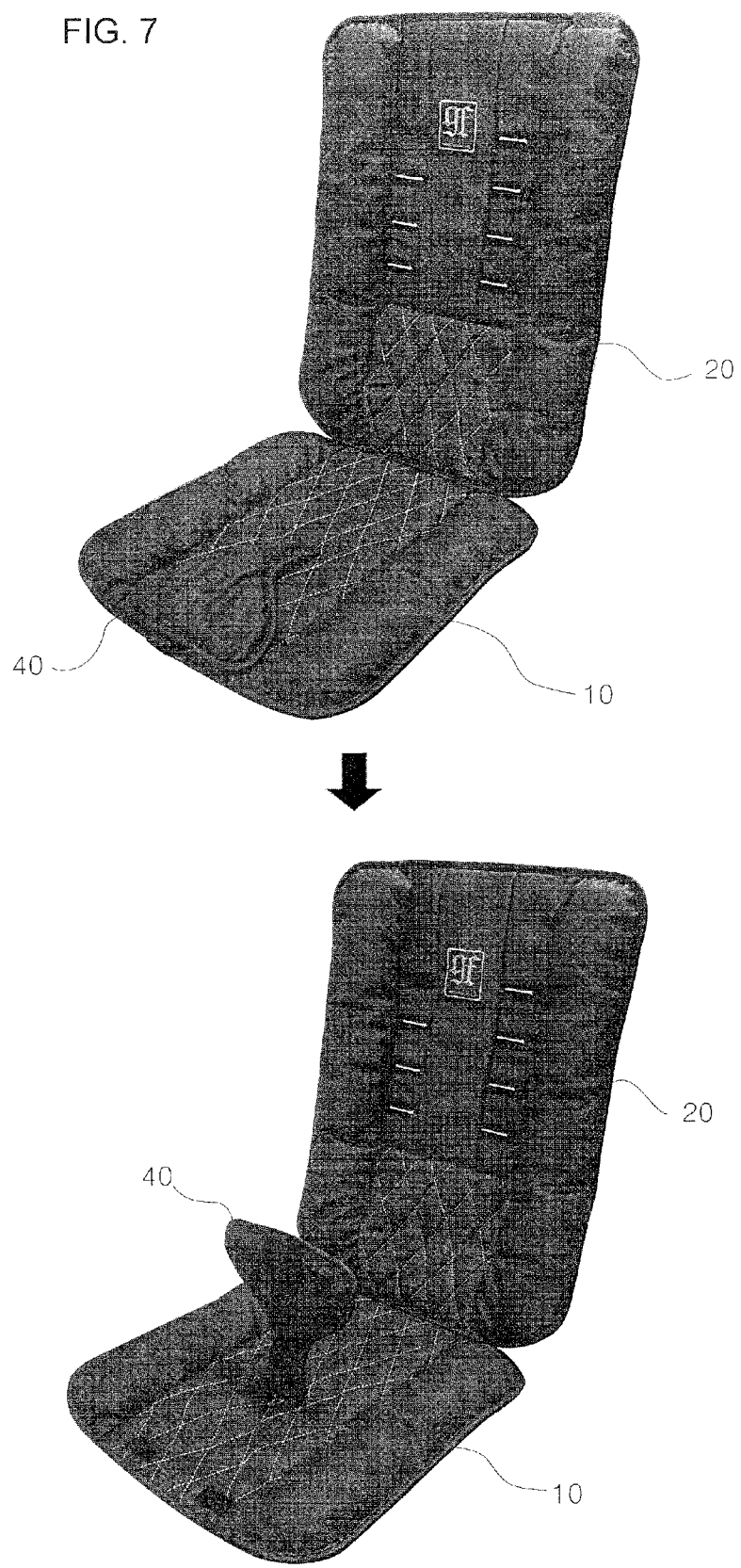
FIG. 7 is a perspective view illustrating a foldable structure of a shielding member of the present invention.
Figure 8:
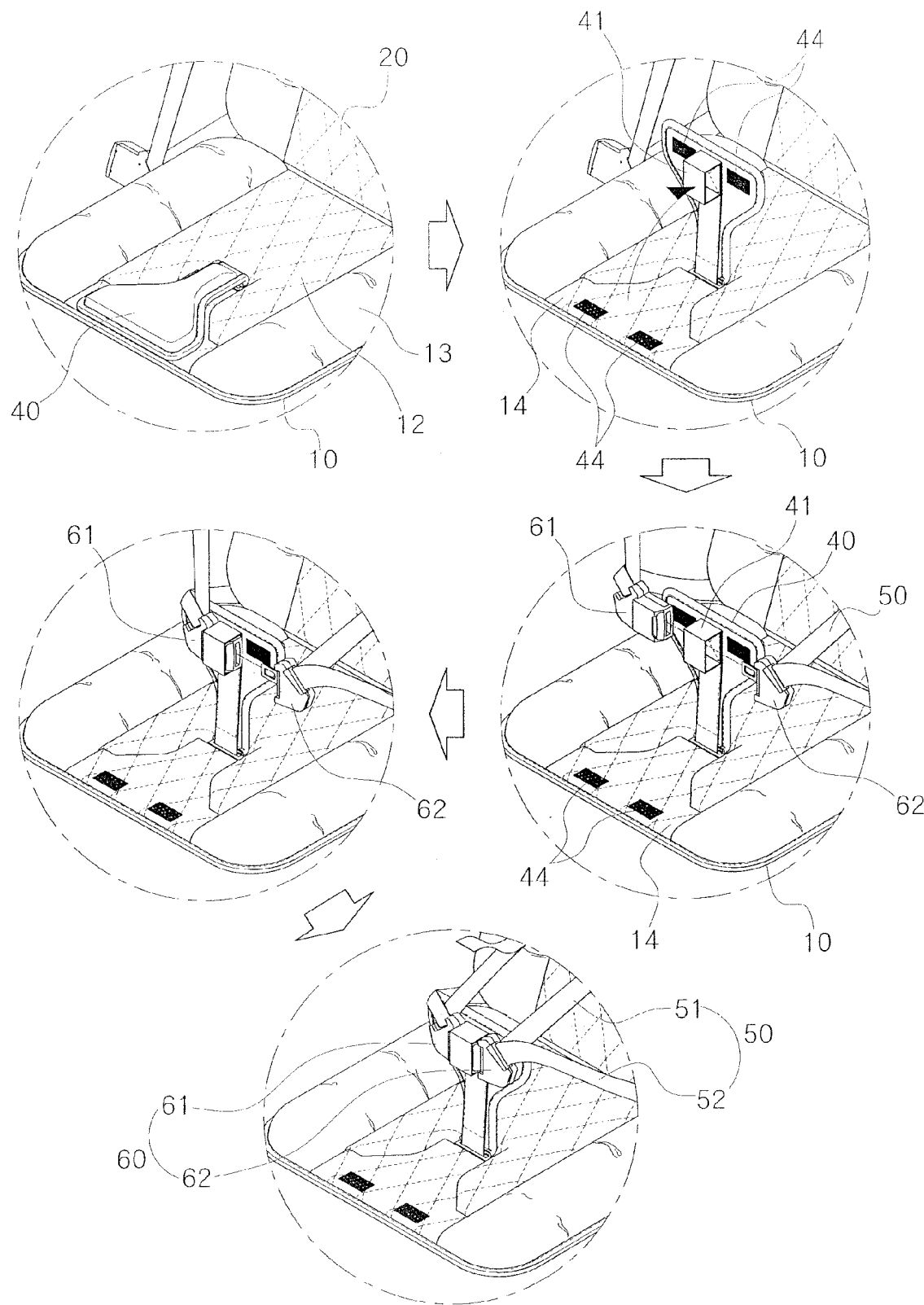
FIG. 8 is a flowchart illustrating a fastening structure of a safety belt when using a seat cover of the present invention as an infant seat.
Figure 9:
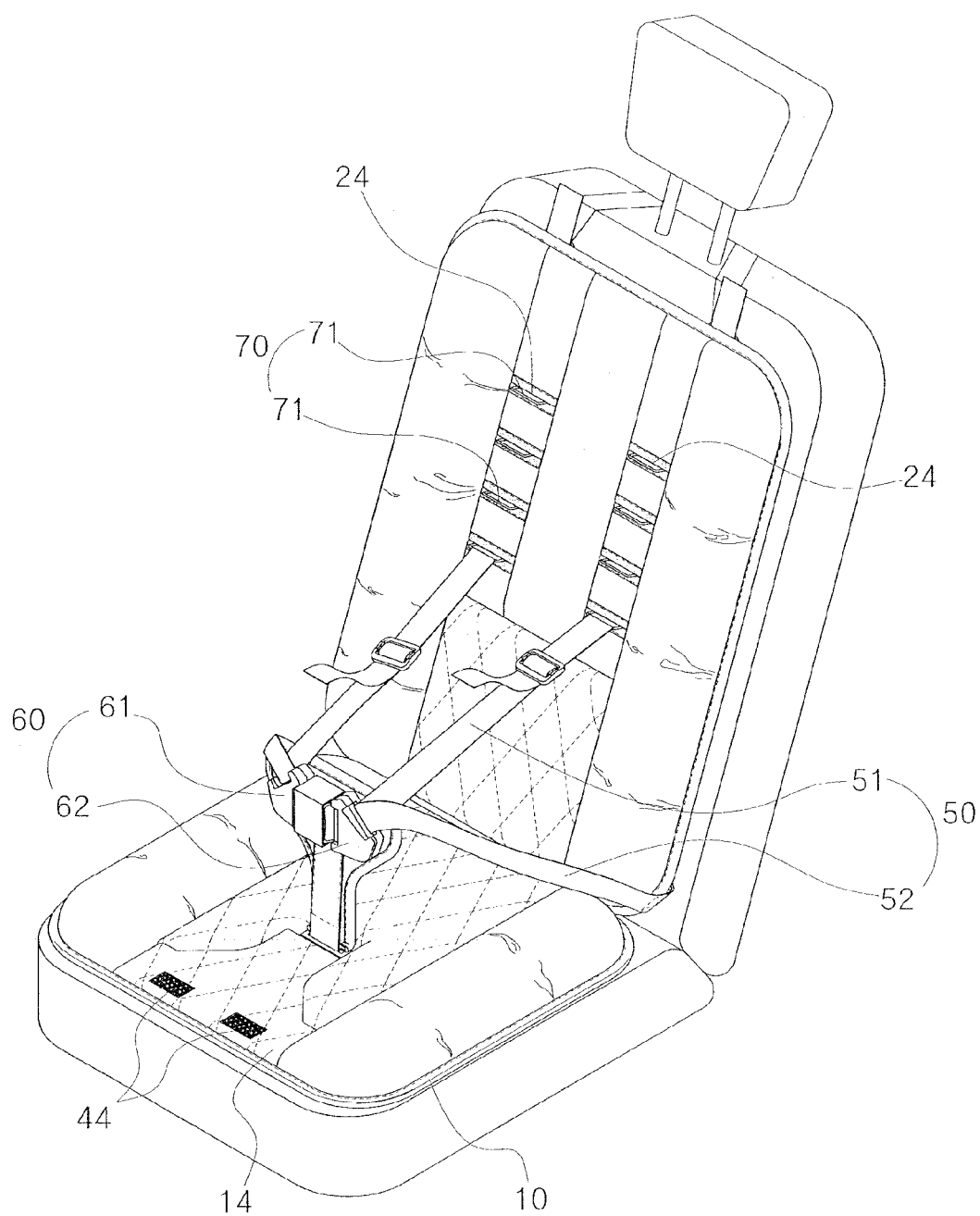
FIG. 9 is a perspective view illustrating a seat cover of the present invention installed to a safety belt.
Figure 10:
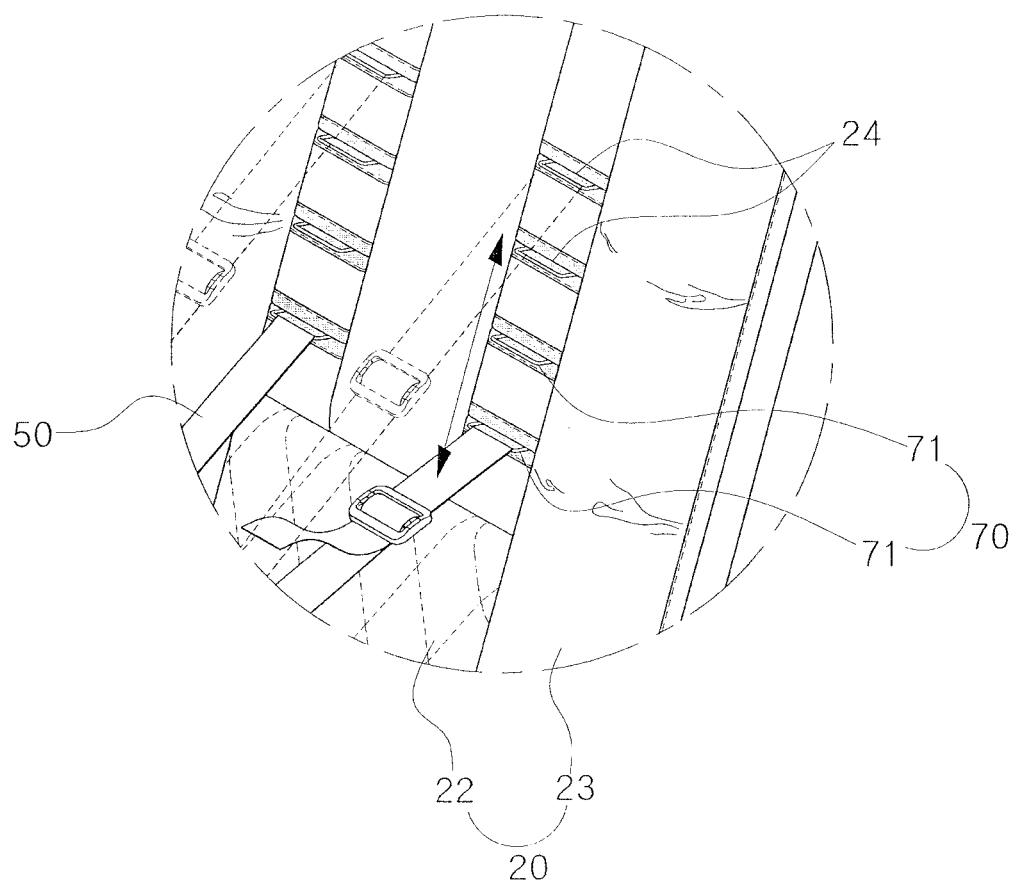
FIG. 10 is a perspective view illustrating a height adjusting structure of a safety belt of the present invention.

That is, as illustrated in FIG. 6, by coupling the safety belt to both ends of the horizontal band provided on the lower end of the backrest sheet 20 and coupling the safety belt again to the vertical band after passing through the shielding member, the entire portion of the body is embraced and protected by the safety belt and the band when the infant and the child fastens the safety belt and the impact occurring from accidents is dispersed to the entire part of the safety belt.

When an adjusting string 33, to which a back latch is installed, is coupled to an upper end of the vertical band 82 provided on both sides of the backrest sheet 20, the seat cover can be more closely coupled to the seat of the vehicle while preventing the backrest sheet 20 from moving forward when the impact is applied. And a reinforcing force can be further improved when upper ends of the two vertical bands are coupled by sewing an auxiliary horizontal band 82.

In addition, it is preferable to form the auxiliary horizontal band 82 in a pocket shape to insert a core member 83*a* of a high harness material such as a metal plate inside of the auxiliary horizontal band 82 to prevent the backrest sheet 20 from bending while maintaining a shape of the backrest sheet.

In addition, preferably, when an auxiliary vertical band 84 is sewed to a lower end of the seat sheet to couple the horizontal band 81 and the shielding member with each other, the dispersion of the impact can be further improved. And to couple and sew the auxiliary vertical band 82 and the shielding member, a cutout hole 12*a* is formed through the seat cushion 12 of the seat sheet 10 to pull out the auxiliary vertical band through the cutout hole 12*a* to sew the auxiliary vertical band to the shielding member 40.

Meanwhile, a head support pad 22*a* is vertically formed at a center of the seat cushion 22 of the backrest sheet 20 and a plurality of hanger loops 71 of the band hanger 70 are vertically provided as multiple columns so that height of the safety belt 50 is adjustable according to the body shape of the infant or the child.

Preferably, a cushion material is accommodated in the head support pad 22*a*, and the width from left to right of the head support pad 22*a* is formed in a range of 100 mm to 120 mm taking the average of a neck thickness of the infant and the child into consideration and includes band hangers 70 disposed on both sides of the head support pad 22*a*.

Figure 11:
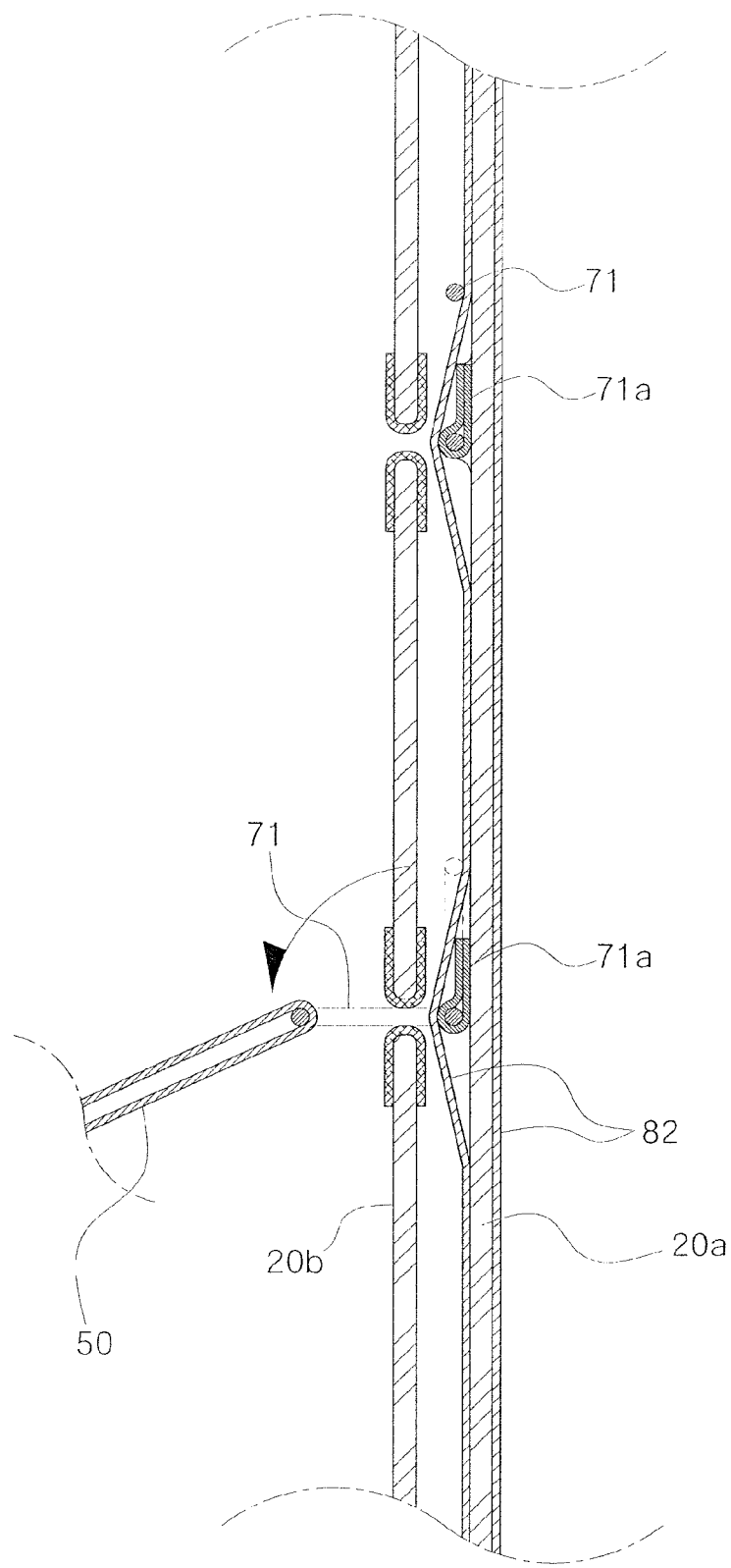
FIG. 11 is a sectional view illustrating a sewing structure of a belt hanger of the present invention.
Figure 12:
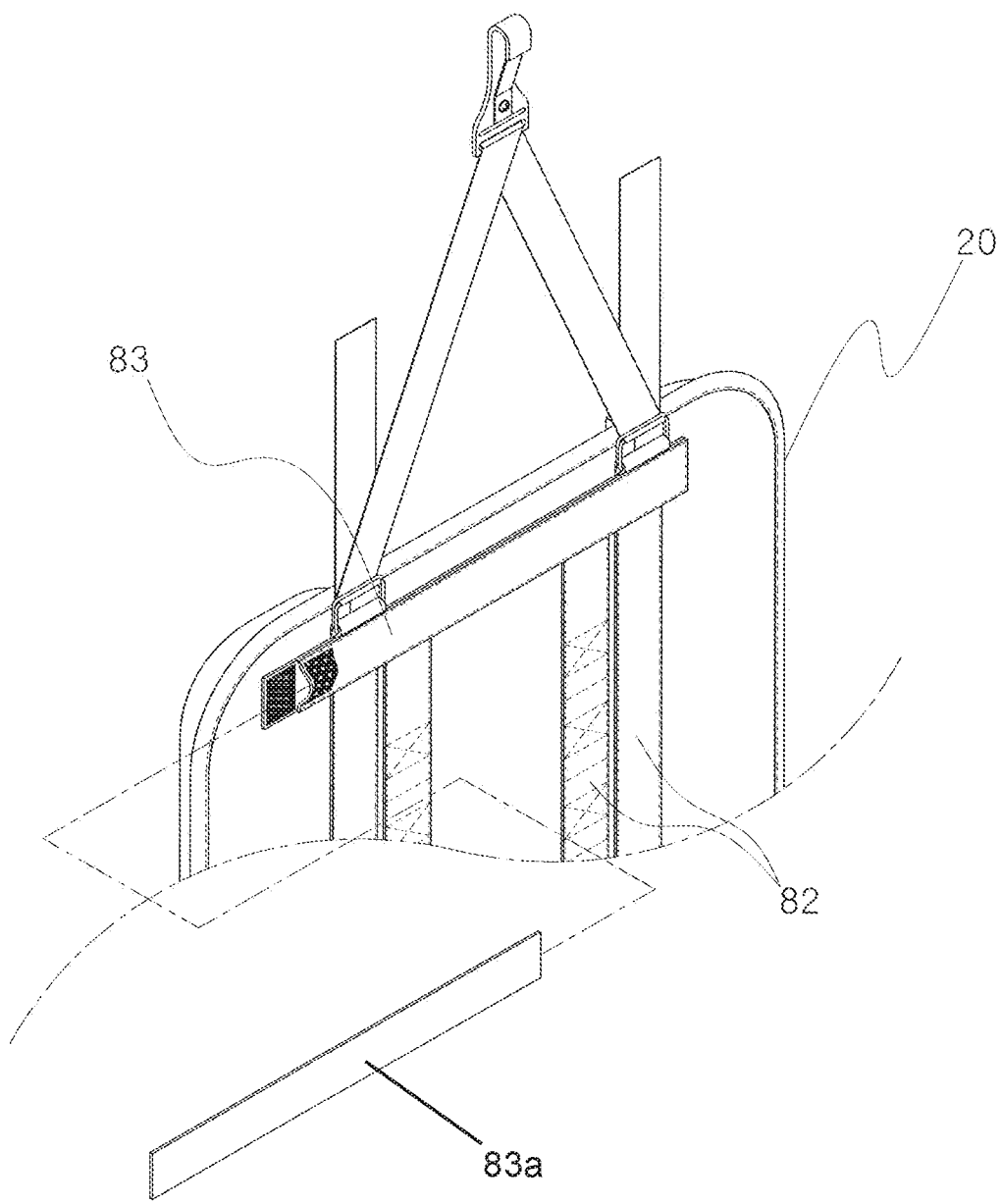
FIG. 12 is a perspective view illustrating a core member installed in an auxiliary horizontal band of the present invention.
Figure 13:
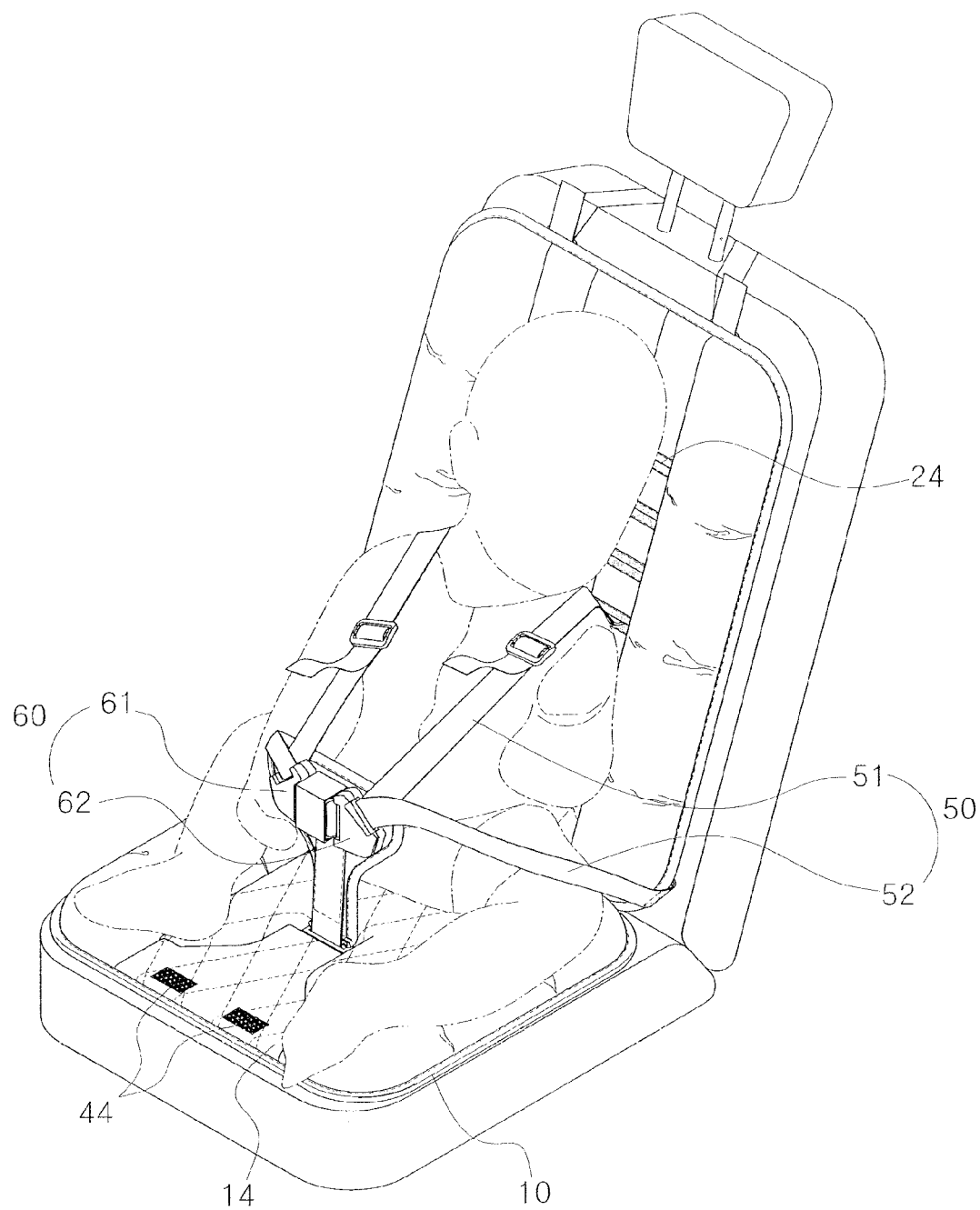
FIG. 13 is a view illustrating an infant seat of the present invention in use.

And, it is preferable for hanger loops 71 to be sewed to the backrest sheet 20 in a foldable shape while being exposed through or buried inside a slot hole 24, which is cut in a horizontal direction. To this end, as illustrated in FIG. 11, by covering the hanger loops 71 with a cover cloth 20*b* and sewing the cover cloth 20*b* after hanging the hanger loops 71 to a loop band 71*a* and sewing the hanger loops 71 to a base cloth 20*a* including the backrest sheet 20, the hanger loops 71 are sewed inside the backrest sheet 20 so that the hanger loops have a foldable structure.

In addition, for the structure of the band hanger 70, when the safety belt 50 is fixed by latching to the hanger loops 71 by vertically arranging the hanger loops 71 and sewing the loop band, which fixes each of the hanger loops 71, with the vertical band 82 of the reinforcing band 80, that is the vertical band 82 sewed along with the backrest sheet 20, the vertical band 82 supports the safety belt 50 and disperses the impact when weight is applied to the safety belt from the impact because the safety belt 50 is coupled to the vertical band 82 when the safety belt 50 is latched and fixed to the hanger loops 71.

The invention claimed is:

1. A combined car seat cover and infant seat comprising:
   a seat sheet (10) and a backrest sheet (20) having two sides, in which cushion materials (11 and 12) are provided, the seat sheet (10) and the backrest sheet (20) being reinforced with a reinforcing band (80) comprising a horizontal band (81) and two vertical bands (82) to disperse an impact applied to the sheet and to prevent the sheet from being torn;
   a seat fixing unit (30) comprising a lower latch (31) and a back latch (32) to fix the seat sheet (10) and the backrest sheet (20) to a vehicle seat; and
   a shielding member (40) having a foldable structure and provided on the seat sheet (10),
   wherein a latch (41) is provided on the shielding member (40), a band hanger (70) is formed at the backrest sheet (20) such that a safety belt (50) including a shoulder contact part (51) and a leg support part (52) and provided with a buckle (60) is fastened to the latch (41) of the shielding member (40) through the band hanger (70), thereby being used as an infant seat, and
   wherein the horizontal band (81) is sewed to a lower end part of the backrest sheet (20) while the two vertical bands (82) are sewed to both sides of the backrest sheet (20) to couple the horizontal band (81) and the two vertical bands (82) of the reinforcing band (80) to the safety belt (50) so that an entire body of an infant or a child is embraced by the safety belt (50) and the reinforcing band (80) to disperse an impact transferring to the body.

2. The combined car seat cover and infant seat according to claim 1, further comprising seat cushions (12 and 22) respectively centered on the seat sheet (10) and backrest sheet (20), and side cushions (13 and 23), which protrude more, relative to the seat cushions (12 and 22), and are provided at both sides of the seat cushions (12 and 22), so that a riding comfort of a passenger is improved, and providing support for an infant or a child when moving to the left and the right.

3. The combined car seat cover and infant seat according to claim 1,
   wherein the shielding member (40) comprises a foldable supporting part (42) and an expansion part (43),
   wherein seat sheet (10) and shielding member (40) are arranged so that legs of the infant or child are placed on both sides of the shielding member (40) to protect an abdomen region of the infant or child, and wherein the seat sheet (10) is formed with a concave part (14) that defines an outer contour of the shielding member (40) such that the foldable support part (42) and the expansion part (43) are inserted into the seat sheet to minimize an upward protrusion of the shielding member (40) when the shielding member (40) is in a folded state.

4. The combined car seat cover and infant seat according to claim 1, wherein the reinforcing band (80) comprises an auxiliary horizontal band (83) sewed to an upper end of the backrest sheet (20) so that the two vertical bands (82) are coupled to each other, and an adjusting string (33) is connected to upper ends of each of the two vertical bands (82) and to the back latch (32).

5. The combined car seat cover and infant seat according to claim 4, wherein the auxiliary horizontal band (83) is formed in a pocket shape and a core member (83*a*) is inserted into the auxiliary horizontal band (83) to prevent the backrest sheet (20) from bending while maintaining a shape of the backrest sheet (20).

6. The combined car seat cover and infant seat according to claim 1, wherein the reinforcing band (80) further comprises an auxiliary vertical band (84) sewed to a lower end of the seat sheet (10) so that the horizontal band (81) and the shielding member (40) are coupled to each other.

7. The combined car seat cover and infant seat according to claim 1, wherein a head support pad (22*a*) is vertically provided at a center of seat cushion (22) of the backrest sheet (20) and a plurality of hanger loops (71) of the band hanger (70) are vertically provided as multiple columns so that height of the safety belt (50) is adjustable.

8. The combined car seat cover and infant seat according to claim 7, wherein the hanger loops (71) are sewed to the backrest sheet (20) in a foldable form, and a slot hole (24), which is incised in a horizontal direction, is formed through the backrest sheet (20) to selectively bury the hanger loops (71) in the backrest sheet (20) and selectively expose the hanger loops (71).

* * * * *